(12) United States Patent
Tseng

(10) Patent No.: US 7,612,772 B2
(45) Date of Patent: Nov. 3, 2009

(54) DISPLAY MONITOR WITH A COMMON DISPLAY DATA CHANNEL

(75) Inventor: Shih-Hua Tseng, Taipei (TW)

(73) Assignee: Tatung Co., Ltd. (TW)

( * ) Notice: Subject to any disclaimer, the term of this patent is extended or adjusted under 35 U.S.C. 154(b) by 682 days.

(21) Appl. No.: 11/126,178

(22) Filed: May 11, 2005

(65) Prior Publication Data

US 2006/0139344 A1 Jun. 29, 2006

(30) Foreign Application Priority Data

Dec. 29, 2004 (TW) ............................. 93141120 A

(51) Int. Cl.
*G06F 3/038* (2006.01)
(52) U.S. Cl. ...................... 345/212; 345/213
(58) Field of Classification Search .............. 345/1.1, 345/211–213; 315/169.1
See application file for complete search history.

(56) References Cited

U.S. PATENT DOCUMENTS

| 5,781,793 A | * | 7/1998 | Larvoire et al. | 712/37 |
|---|---|---|---|---|
| 6,753,881 B1 | * | 6/2004 | Callway et al. | 345/699 |
| 7,098,899 B1 | * | 8/2006 | Ginosar | 345/204 |
| 2003/0137502 A1 | * | 7/2003 | Lee | 345/212 |
| 2004/0003307 A1 | * | 1/2004 | Tsuji | 713/310 |
| 2005/0050272 A1 | * | 3/2005 | Behrens et al. | 711/114 |
| 2005/0116884 A1 | * | 6/2005 | Kim et al. | 345/11 |
| 2005/0253560 A1 | * | 11/2005 | Popescu-Stanesti et al. | 320/138 |
| 2006/0085627 A1 | * | 4/2006 | Noorbakhsh et al. | 713/1 |

* cited by examiner

*Primary Examiner*—Chanh Nguyen
*Assistant Examiner*—Long Pham
(74) *Attorney, Agent, or Firm*—Lowe Hauptman Ham & Berner, LLP

(57) ABSTRACT

A display monitor for a common display data channel uses a DDC access switch to separate the common display data channel, so that regardless of whether the display monitor is powered on or off, a personal computer can access the Extended Display Identification Data (EDID) in the EEPROM, and the low-level voltage of an MCU in the display monitor won't interfere in the access between the personal computer and the EEPROM. When the power of the display monitor is turned on, the DDC access switch closes so that the MCU can access the EDID in the EEPROM.

4 Claims, 2 Drawing Sheets

DISPLAY MONITOR WITH A COMMON DISPLAY DATA CHANNEL

RELATED APPLICATION

The present application is based on, and claims priority from, Taiwanese Application Number 093141120, filed Dec. 29, 2004, the disclosure of which is hereby incorporated by reference herein in its entirety.

REARGROUND OF THE INVENTION

1. Field of the Invention

The present invention relates to a display monitor, and more particularly, to a display monitor with a common display data channel.

2. Description of the Related Art

With technological improvements, image display technologies have become necessary components for many electronic products, such as computer monitors, TV screens, cell phone displays, etc. For traditional display monitors, only one independent channel exists for accessing EDID (extended display identification data) stored in EEPROMs. However, when a display monitor requires updating, two EEPROMs must be updated, which wastes time. Therefore, a common display data channel technology has been developed to resolve this problem.

A circuit block drawing of a prior art common display data channel is shown in FIG. 1. A display monitor 20 comprises: an EEPROM 22, a display monitor power supply 23, a microprocessor 21, and an internal device 24; the EEPROM 22 is powered by a computer host power supply 11. Both the computer host 10 and the microprocessor 21 of the display monitor 20 can access the EEPROM 22; consequently, only the EEPROM 22 needs to be written to for updating. However, when the display monitor power supply 23 of the display monitor 20 is not turned on, the microprocessor 21 of the display monitor 20 is turned off too, and so a channel 210 connected to the microprocessor 21 is at low electrical potential state. Due to the low electrical potential state of the channel 210, the computer host 10 cannot access the EEPROM 22. Moreover, without a power-saving mode, the internal device 24 of the display monitor 20 continuously consumes power.

Therefore, it is desirable to provide a display monitor for a common display data channel to mitigate and/or obviate the aforementioned problems.

SUMMARY OF THE INVENTION

The present invention provides A display monitor with a common display data channel comprises: a first channel connected to a computer host; a second channel connected to a microprocessor; a display monitor power supply; a memory device connected to the first channel so the computer host is capable of accessing the memory device via the first channel; a DDC access switch connected to the first channel, the second channel, and the power supply; wherein when the display monitor power supply is turned on, the first channel and the second channel are provided power; and a microprocessor connected to the second channel and the power supply; wherein when the display monitor power supply is turned on, the microprocessor is capable of accessing the memory device via the second channel to the first channel by using the DDC access switch.

In the display monitor of the present invention comprises a first channel, a second channel, a display monitor power supply, a memory device, a microprocessor, and a DDC switch. The first channel is connected to the memory and a computer host so the computer host can access the memory device via the first channel. The second channel is separately connected to the DDC switch and the microprocessor. Furthermore, the DDC switch is connected to the first channel and the display monitor power supply, when the display monitor power supply is turned off, the DDC switch separates the first channel and the second channel to prevent the low electric potential of the second channel from affecting transmission of the first channel. When the display monitor power supply is turned on, the DDC switch conducts the first channel and the second channel, so the microprocessor can be connected to the first channel via the second channel to access the memory device.

The display monitor further comprises an internal device and a power control device connected to the display monitor power supply, the power control device limiting power to the internal device in response to receiving a saving-energy signal output by the microprocessor.

Furthermore, the first channel and the second channel are display data channel (DDC).

Other objects, advantages, and novel features of the invention will become more apparent from the following detailed description when taken in conjunction with the accompanying drawings.

DETAILED DESCRIPTION OF THE PREFERRED EMBODIMENT

Figure 1:
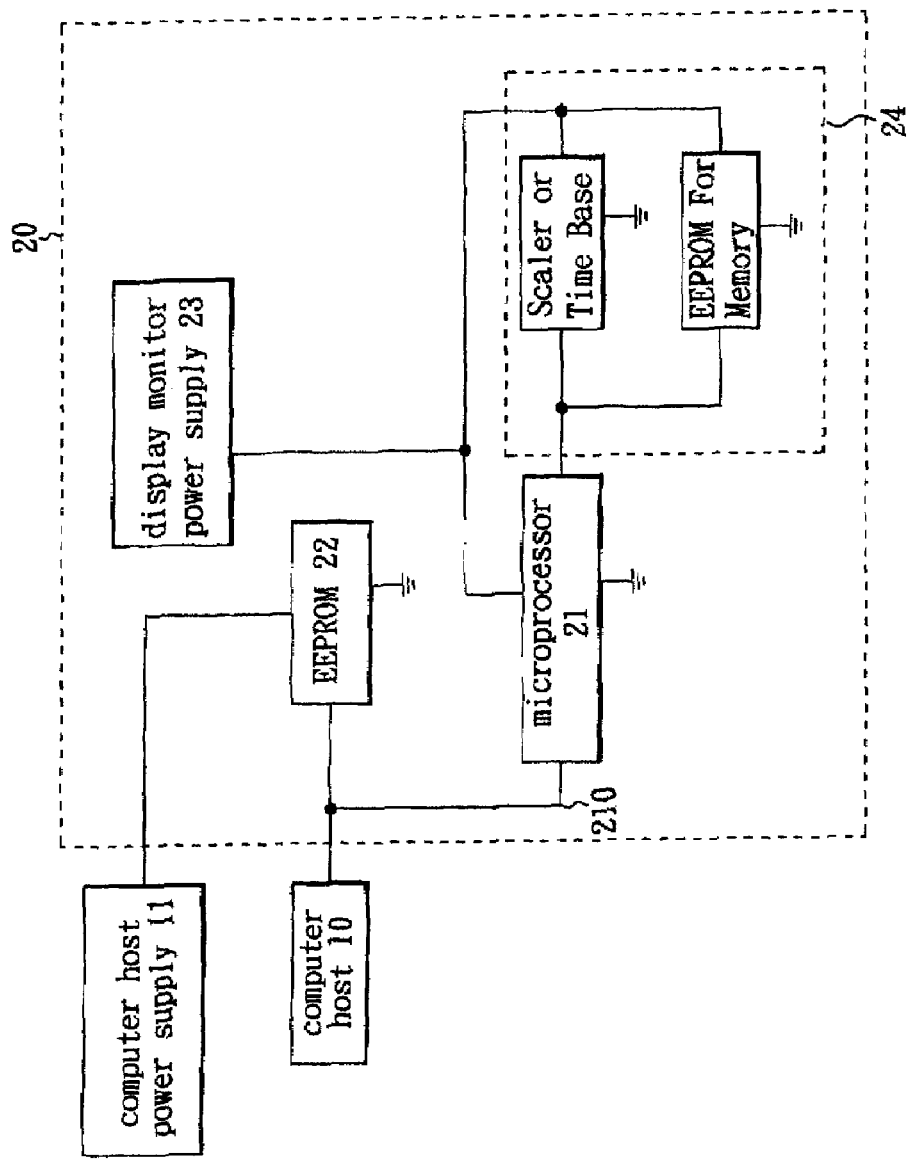
FIG. 1 is a circuit block drawing of a prior art common display data channel.
Figure 2:
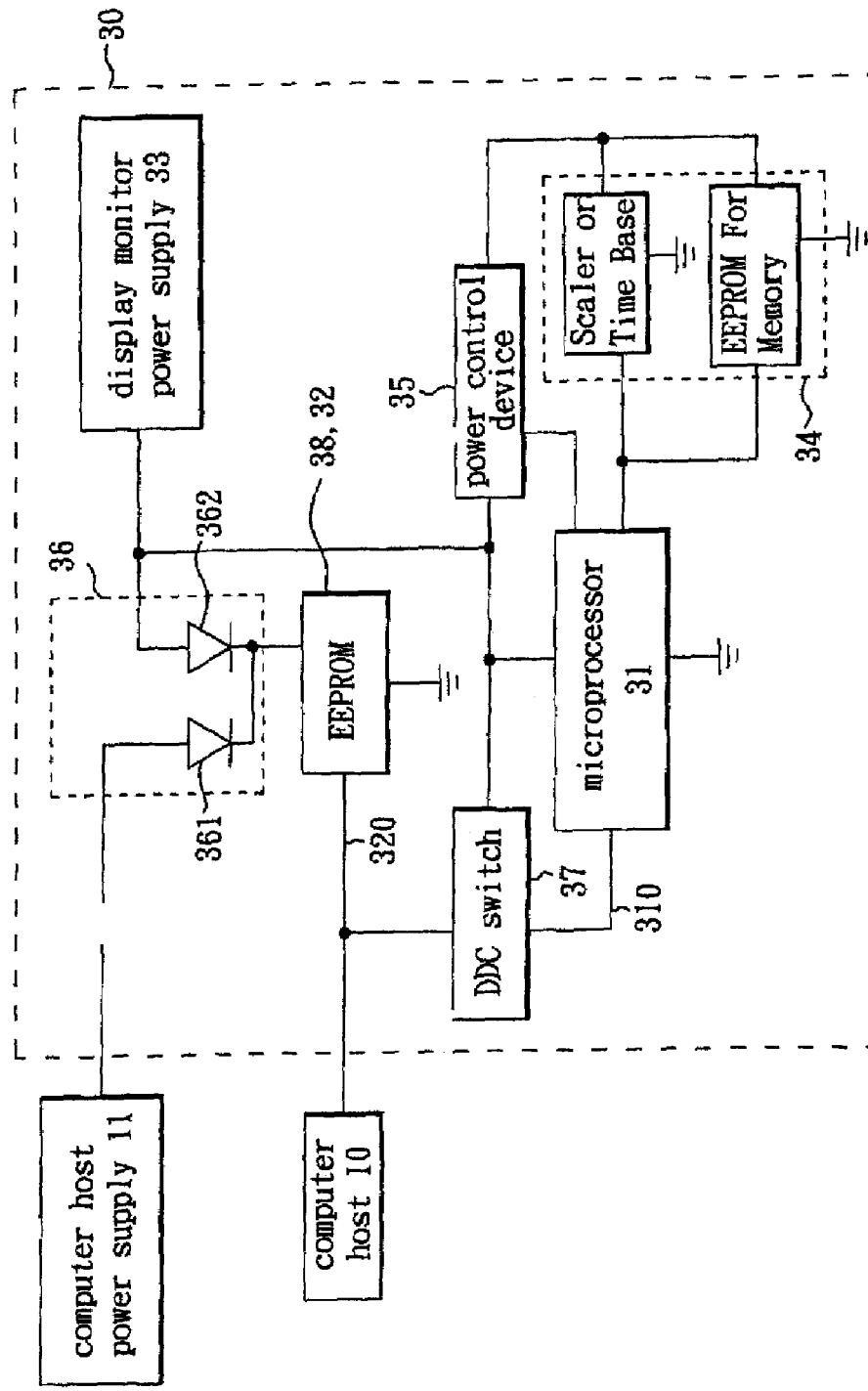
FIG. 2 is a circuit block drawing of a common display data channel of a preferred embodiment according to the present invention.

FIG. 2 is a circuit block drawing of a common display data channel of a preferred embodiment according to the present invention. As shown in the drawing, a display monitor 30 of common display data channel of the present invention comprises: a first channel 320, a second channel 310, a display power supply 33, a memory device 38, a microprocessor 31, a DDC switch 37, a composite power supply 36, and an internal device 34. In this embodiment, the memory device 38 is an EEPROM 32.

The first channel 320 is connected to a computer host 10; the EEPROM 32, the DDC switch 37 and the computer host 10 can access EDID (extended display identification data) from the EEPROM 32 via the first channel 320. As long as at least one of either a host power supply 11 or a display monitor power supply 33 is turned on, the composite power supply 36 can provide power to the EEPROM 32 for operational purposes. For example, when the display monitor 30 is not turned on but the computer host needs to access the EEPROM 32, even though the display monitor power supply 33 cannot provide power, the composite power supply 36 still receives power from the host power device 11 and provides this power to the EEPROM 32. At the same time, the microprocessor 31 is turned off, and so the second channel 310 is in a low electric potential state. However, the DDC switch 37 connected to another end of the second channel 310 is also turned on; therefore, the first channel 320 cannot be connected to the second channel 31, and the low electric potential of the second channel 310 does not affect transmission of the first channel 320.

When the display monitor 30 is turned on, the display monitor power supply 33 provides power to the DDC switch 37 and the microprocessor 31, and so the DDC switch 37 can execute a switching process and power the first channel 320 and the second channel 310. Subsequently, both the computer host 10 and the microprocessor 31 can directly access data from the EEPROM 32 to provide common display data channel results and reduce data access failures caused by power shortages of the display monitor power supply 33.

The composite power supply 36 further comprises two diodes 361, 362 separately connected to the host power supply 11 or the display monitor power supply 33, and the composite power device 36 can provide power to the EEPROM 32 when either one of the host power supply 11 or the display monitor power supply 33 is turned on.

The display monitor 30 further comprises an internal device 34 and a power control device 35. The power control device 35 can be electrically connected to the display monitor power device 33, the microprocessor 31, and the internal device 34, and when a user wants to initiate an energy-save mode, the microprocessor 31 outputs an energy-saving signal to the power control device 35 to stop providing power to the internal device 34.

Although the present invention has been explained in relation to its preferred embodiment, it is to be understood that many other possible modifications and variations can be made without departing from the spirit and scope of the invention as hereinafter claimed.

What is claimed is:

1. A display monitor with a common display data channel comprising:
    a first data channel connected to a computer host having a computer host power supply;
    a second data channel connected between the computer host and a microprocessor;
    a display monitor power supply;
    a memory device connected to the first data channel so the computer host is capable of accessing the memory device via the first data channel;
    a composite power supply connected to the host power supply and the display monitor power supply for providing power to the memory device;
    a DDC access switch connected to the first data channel, the second data channel, and the display monitor power supply;
    wherein when the display monitor power supply is turned off, the DDC access switch is switched to separate the first data channel and the second data channel and the composite power supply provides power from the host power device to the memory device so as to enable the computer host to access the memory device via the first data channel without being affected by low electric potential on the second data channel, and when the display monitor power supply is turned on, the DDC access switch is switched to connect the first data channel and the second data channel; and
    a microprocessor connected to the second data channel and the display monitor power supply; wherein when the display monitor power supply is turned on, the composite power supply provides power from the display monitor power supply to the memory device, so that the microprocessor is capable of accessing the memory device via the second data channel and the first data channel connected by the DDC access switch.

2. The display monitor with a common display data channel as claimed in claim 1, wherein the composite power supply comprises two diodes separately connected to the host power supply and the display monitor power supply for providing power to the memory device.

3. The display monitor with a common display data channel as claimed in claim 1, further comprising: an internal device and a power control device connected to the display monitor power supply, the power control device limiting power to the internal device in response to receiving a saving-energy signal output by the microprocessor.

4. The display monitor with a common display data channel as claimed in claim 1, wherein the memory device is an EEPROM stored with extended display identification data for the display monitor.

* * * * *